Figure 1:
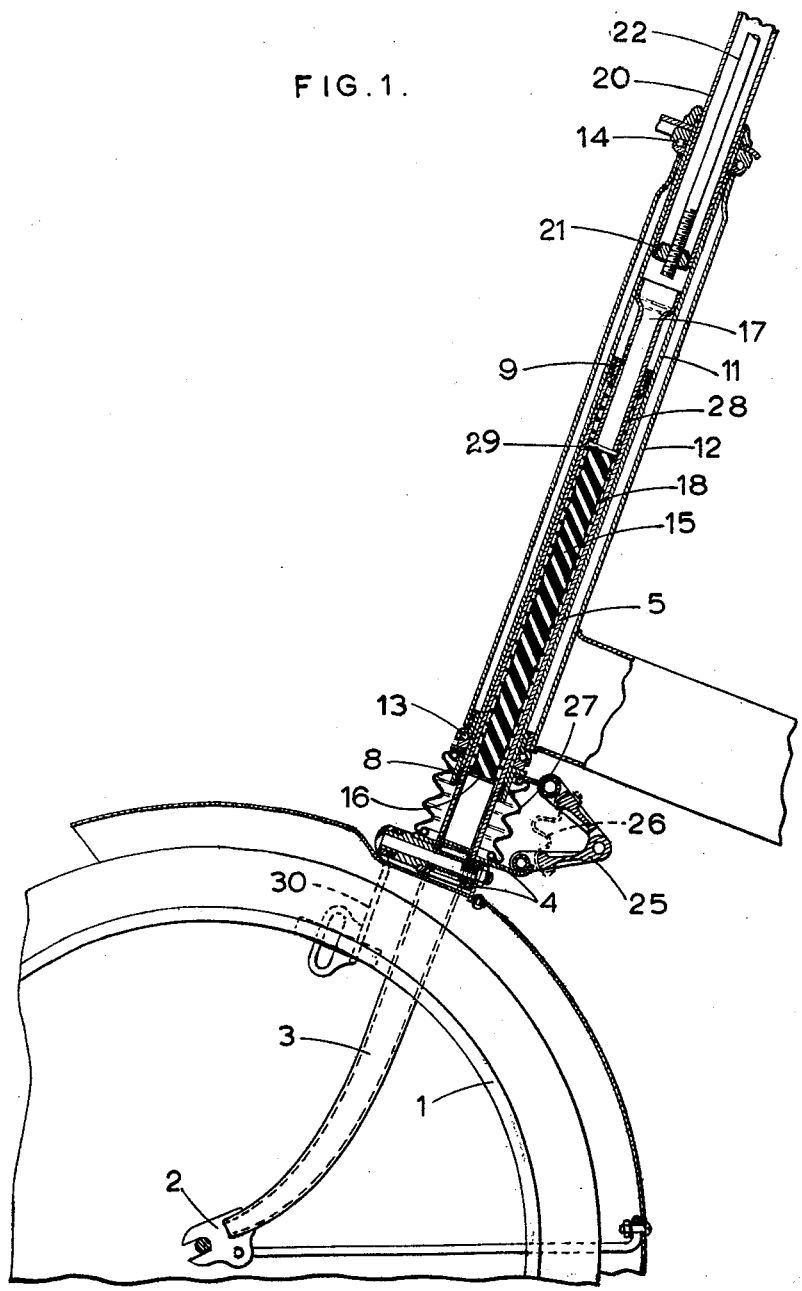

March 26, 1963 A. E. MOULTON 3,083,038
TELESCOPIC SPRING SUSPENSION SYSTEMS FOR THE
FRONT WHEELS OF BICYCLES, MOPEDS, MOTOR
SCOOTERS AND MOTOR CYCLES
Filed Jan. 26, 1962 3 Sheets-Sheet 1

INVENTOR
ALEXANDER ERIC MOULTON
BY
Shoemaker and Mattare
ATTORNEYS

March 26, 1963 A. E. MOULTON 3,083,038
TELESCOPIC SPRING SUSPENSION SYSTEMS FOR THE
FRONT WHEELS OF BICYCLES, MOPEDS, MOTOR
SCOOTERS AND MOTOR CYCLES
Filed Jan. 26, 1962 3 Sheets-Sheet 2
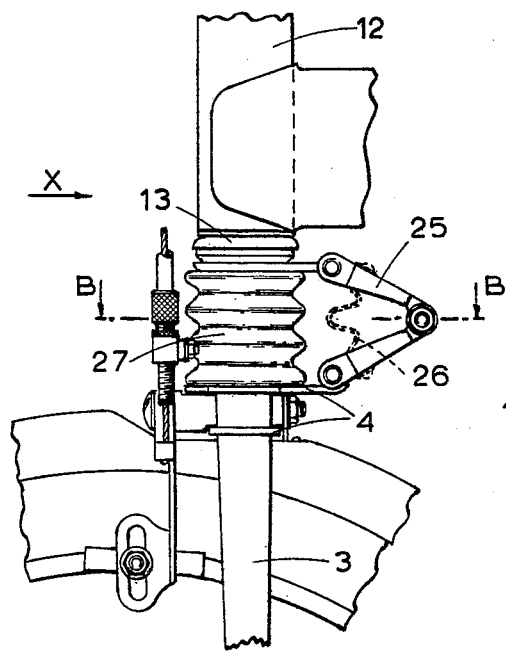
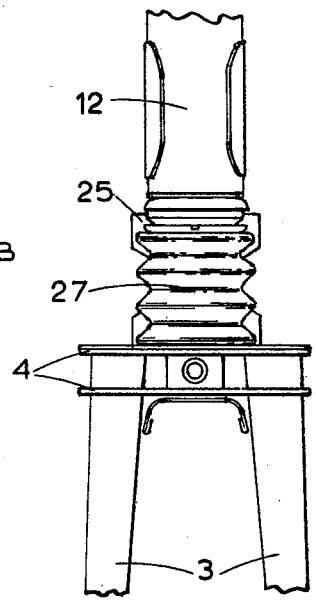
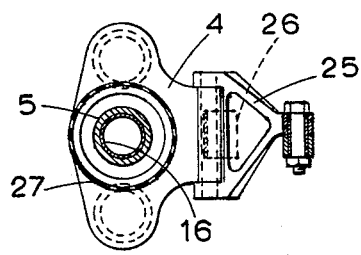
INVENTOR
ALEXANDER ERIC MOULTON
BY
Shoemaker and Mattare
ATTORNEYS March 26, 1963

A. E. MOULTON 3,083,038

TELESCOPIC SPRING SUSPENSION SYSTEMS FOR THE
FRONT WHEELS OF BICYCLES, MOPEDS, MOTOR
SCOOTERS AND MOTOR CYCLES

Filed Jan. 26, 1962

3 Sheets-Sheet 3

INVENTOR
ALEXANDER ERIC MOULTON
BY
Shoemaker and Mattare

ATTORNEYS

United States Patent Office 3,083,038
Patented Mar. 26, 1963

3,083,038
TELESCOPIC SPRING SUSPENSION SYSTEMS FOR THE FRONT WHEELS OF BICYCLES, MOPEDS, MOTOR SCOOTERS AND MOTOR CYCLES
Alexander Eric Moulton, Bradford-on-Avon, England, assignor to Moulton Consultants Limited, Bradford-on-Avon, England, a British company
Filed Jan. 26, 1962, Ser. No. 169,712
8 Claims. (Cl. 280—276)

This invention relates to front wheel spring suspension systems for two wheeled cycle vehicles such as bicycles, mopeds, motor scooters or motor cycles.

In the specification of United States patent application No. 65,830 which is assigned to the same assignee as the invention in this application, a bicycle or moped is described characterised by the use of rubber tyred wheels of small overall diameter. The front wheel suspension described in that specification was of the leading link type.

An alternative type of front wheel suspension is now proposed which is especially suitable for this small wheeled bicycle.

A spring suspension system for a bicycle, moped, motor scooter or motor bicycle according to the present invention comprises a conventional fork arrangement supporting the front wheel spindle and bridged by a conventional crown having upstanding from and fixed to it a single hollow tube, hereafter referred to as a "fork tube," which telescopes resiliently inside a conventional steering column, such steering column being supported in a conventional manner in the head tube of the frame by widely spaced ball bearings, while steering movement is conveyed to the steering column from a conventional handle bar stem which is connected to the column in known manner by means of an expander bolt or by a head clip.

The fork tube may have at its upper end a bush (preferably a self-lubricating bush, formed for example, of sintered bronze or nylon) which bears on the bore of the steering column while the lower part of the fork tube is supported by a similar bush carried at the base of the steering column just below the bottom ball bearing.

When the invention is applied to a bicycle or moped as described in the aforementioned specification, owing to the small diameter of the wheel and the large dimension between the bottom head bearing and the top head bearing (i.e. the long head tube), there is an adequate span between the supporting bearings of the fork tube which is an essential requirement for correct functioning of a telescopic construction. Moreover the outside diameter of the fork tube between the bearing span may be slightly reduced by rolling down to eliminate the possibility of binding on the bore of the steering column under high loads.

The rotational movement of the assembly about its axis required for the steering function is achieved by either a splined assembly or a toggle linkage which connects the steering column to move with the fork crown in the steering mode, whilst allowing the telescopic movement required for springing.

Within the fork tube is placed a compression spring, either of the helical steel coil type or of the rubber compression block type or a combination thereof. One end of the spring bears against an abutment at the base of the fork tube while the other end bears against a stool attached to the bore of the steering column near its upper end.

A rebound stop device can conveniently be achieved by means of a strap demountably attached to limit the stroke of the toggle linkage.

Figure 5:
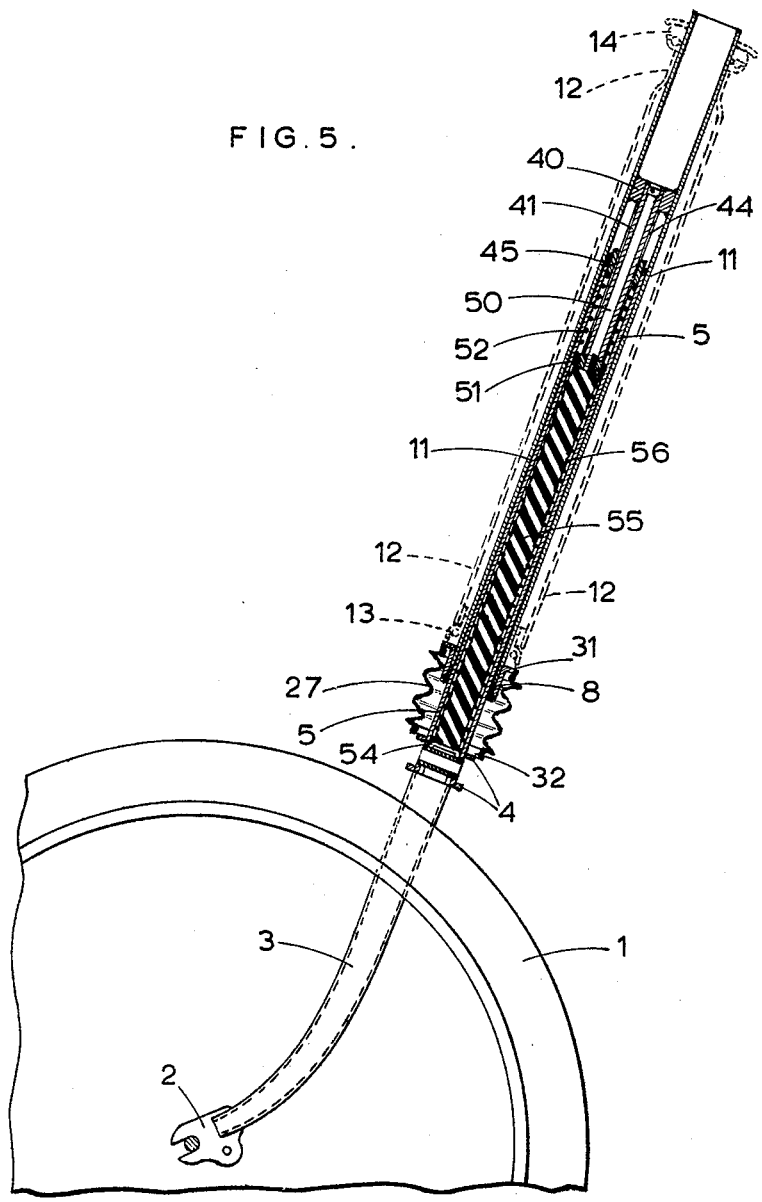

Two embodiments of the invention are illustrated by way of example in the accompanying drawings in which:

FIGURE 1 is a part-sectional side elevation of the front suspension arrangement of a small-wheeled bicycle with a telescopic steering column assembly according to a first embodiment of the invention, and FIGURE 2 is a side view of the crown assembly of such arrangement, FIGURE 3 is a view taken on the line B—B of FIGURE 2, FIGURE 4 is a front view of the crown assembly of the front suspension arrangement illustrated in FIGURE 1, FIGURE 5 is a sectional side view of a telescopic steering column assembly according to a second embodiment of the invention.

Referring now to FIGURES 1 to 4 of the drawings, the front wheel 1 which has an overall diameter of approximately 16 inches is carried in known manner at the lower end 2 of a pair of forks 3 which are raked forwardly and bridged at their upper ends by a crown 4.

Extending upwardly from the crown 4 is a fork tube 5 which is rigidly attached at its lower end to the crown 4 while its upper part is slidably mounted, by means including bushings 8 and 9, for telescopic axial movement within a tubular steering column 11. The steering column 11 is located in a front upstanding tubular member or head tube 12 of the frame of the bicycle by widely spaced ball bearing assemblies 13 and 14 located at the opposite ends of the head tube 12, the arrangement being such that the steering column can be rotated about its axis but is prevented from axial movement within the head tube.

Within the fork tube 5 is a compression spring which in this embodiment is constituted by a rubber block 15 surrounded by a helical coil steel spring 18 the lower ends of the springs bearing against an abutment 16 at the base of the fork tube 5, while their upper ends bear against an abutment or head 29 fixed to the lower end of a stool 17 whose upper end is attached to the internal bore of the steering column 11.

Into the upper end of the steering column 11 a conventional handle bar stem 20 is fitted and is clamped therein by means of an expander nut 21 which can be tightened on a bolt 22.

A toggle linkage 25 is connected between the fork tube 5 and the steering column 11, such linkage allowing axial but preventing rotational movement of the tube 5 relative to the column 11. The toggle linkage may be provided with a strap 26 which limits the stroke of the toggle, thereby serving to limit the rebound stroke of the suspension. Alternatively a rebound spring 28 may be arranged to operate between the abutment 29 and the bush 9. Telescopic bellows 27 may be provided to seal the sliding parts 5 and 11 against ingress of dirt.

This construction of front wheel suspension allows the mounting of conventional caliper brake assembly generally designated 30 in the conventional position at the crown. Moreover, a suspension system according to the invention enables all the telescoping surfaces to be completely enclosed either within the head tube or within the telescopic bellows 27 as shown. Excellent steering is obtained by this invention according to which concentration of steering mass behind the steering axis is minimised, while a consistency of head angle, offset and trail, through the excursion of the wheel on its suspension are provided for.

Damping of the suspension is provided by friction between the telescoping elements and the bushings 8 and 9 but if necessary additional damping means may be provided suitably taking the form of an hydraulic damper arrangement located within the steering column.

Instead of the toggle linkage 25 shown in FIGURES 1–4 steering connection between the steering column 11 and the fork tube 5 may be provided by a splined connection between these members. Such an arrangement is shown in FIGURE 5.

In FIGURE 5, as in FIGURE 1, the spindle of the front wheel 1 is mounted at the lower ends 2 of a pair of fork arms 3 which are raked forwardly and bridged together at their upper ends by a crown 4.

Extending upwardly from the crown 4 is a fork tube 5 which is mounted for telescopic axial movement within a tubular steering column 11.

In this embodiment also, the steering column 11 is mounted within a head tube 12 which forms part of the frame of the vehicle, by widely spaced ball bearing assemblies 13 and 14, the arrangement being such that the steering column 11 is rotatable about its axis but is prevented from axial movement relative to the head tube 12.

In the upper end of the steering column 11 will be fitted a conventional handle bar stem surmounted by handle bars, the arrangement being similar to that shown in FIGURE 1.

According to this embodiment of the invention however, fixed within the bore of the steering column 11 near its upper end, is a bush 40 from which depends a tubular stool 41 having axially directed spline ribs 44 on its external surface.

Fixed within the bore of the fork tube 5 at its upper end is a bush 45 said bush having serrations in its bore adapted to engage slidably the spline ribs 44 of the stool 41, thereby preventing rotation of the fork tube 5 relative to the steering column 11, while permitting telescoping of these elements.

The bush 45 serves also to support the fork tube 5 axially of the steering column 11.

In the bore of the stool 41 is a bolt 50 at whose lower end is screwed a flanged abutment 51. Between the flanges of the abutment 51 and the bush 45 is a coil spring 52 which serves as a rebound spring.

Closing the lower end of the fork tube 5 is an abutment 54 between which and the abutment 51 is a tubular block of rubber 55 surrounded by a steel coil spring 56. The spring 56 serves both to support the rubber block 55 within the bore of the fork tube 5 and, in conjunction with the rubber block 55, as a compression spring resiliently resisting upward telescopic axial movement of the fork tube 5 within the steering column 11.

A bearing bush 8 is provided within a flanged member 31 located at the lower end of the steering column 11, said bush bearing against the periphery of the fork tube 5 to locate the lower part of the tube 5 axially of the column 11. A bellows 27 is provided between the flanged member 31 and a flanged member 32 carried above the crown 4, said bellows protecting the telescoping elements against ingress of dirt.

In operation, wheel shocks in bump are transmitted by the forks 3 to the fork tube 5 upstanding from the crown 4, the tube 5 moving upwardly, and telescopically, within the steering column 11. Such upward movement causes resilient deformation, in compression, of the rubber block 55 and of the coil spring 56, between the abutment 51, which is fixed in rotation to the steering column 11, and the abutment 54 which is fixed at the lower end of the fork tube 5. Movement in bump is determined when the flange 32 abuts with the lower end of the flange 31 although this limit will not normally be reached, owing to the resistance of the compression springs 55 and 56.

In rebound, when the fork tube moves downwardly within the steering column 11 the rebound spring 52 is compressed between the abutment 51 and the bush 45 carried at the upper end of the fork tube 5, the maximum compression allowed by the spring 52 limiting the stroke in rebound.

The splined engagement of the bush 45 with the stool 4 provides for relative axial movement but prevents relative rotation of the steering column 11 and the fork tube 5.

In this way steering movement conveyed to the steering column 11 from the handle bars is transmitted to the fork tube 5 and thereby to the crown 4 and the forks 3 of the front wheel.

Although in both the above described embodiments, the compression spring means is constituted by a block of rubber surrounded by a helical steel spring, either a rubber block or a steel coil spring or any other suitable compression spring means may be employed independently as an alternative.

I claim:

1. A resilient suspension and steering assembly for the front wheel of a bicycle having a frame, a first tubular member rotatably mounted within said frame, a second tubular member axially slidable within said first tubular member, a spline means slidably connecting said tubular members and preventing relative rotation therebetween, a handlebar secured to one of said tubular members, a wheel fork secured to the other of said tubular members, compression spring means mounted within said tubular members and resisting relative axial movement therebetween, said spring means comprising a cylindrical bar of rubber enclosed in a steel coil spring, means preventing axial movement relative to the frame of the tubular member which is secured to said handle bar.

2. An assembly as defined in claim 1, wherein the handlebar includes a downwardly extending stem expanded into frictional engagement with the interior of said first tubular member.

3. An assembly as defined in claim 1, wherein said compression spring means is confined wholly within said second tubular member, an abutment secured to said second tubular member engaging one end of said spring means, a stool member secured within and to said first tubular member extending axially into said second tubular member and engaging the other end of said spring means.

4. An assembly as defined in claim 3, wherein said spline means includes a bushing fixed to said second tubular member, axial splines formed on said stool member mating with axial grooves formed in said bushing.

5. An assembly as defined in claim 3, wherein said spring means is compressed when said fork moves toward said handle bar, rebound spring means compressed between a bushing fixed to said second tubular member and said stool adapted to resist movement by said fork away from said handlebar.

6. An assembly as defined in claim 5, wherein said rebound spring means comprises a coil spring surrounding said stool, said stool including a head on its lower end extending between and engaging both said spring means, the upper end of said rebound spring means abutting said bushing.

7. An assembly as defined in claim 6 wherein said tubular members extend below a bearing sleeve of said frame, said second tubular member extending below said first tubular member, a flexible rebound stop sleeve enclosing a lower end portion of said second tubular member and having its opposite ends secured to the lower ends of said tubular members.

8. An assembly as defined in claim 6, including an annular friction bushing surrounding said second tubular member and secured to said first tubular member so as to frictionally dampen axial movement between said tubular members.

References Cited in the file of this patent

UNITED STATES PATENTS

| | | |
|---|---|---|
| 51,368 | Vose | Dec. 5, 1865 |
| 783,236 | Ashburn | Feb. 21, 1905 |
| 2,756,070 | Torre | July 24, 1956 |

FOREIGN PATENTS

| | | |
|---|---|---|
| 26,921 | France | Dec. 6, 1923 |